United States Patent [19]
Iimura

[11] Patent Number: 5,353,270
[45] Date of Patent: Oct. 4, 1994

[54] WRITABLE OPTICAL DISK RECORDING APPARATUS

[75] Inventor: Shinichiro Iimura, Kanagawa, Japan

[73] Assignee: Sony Corporation, Tokyo, Japan

[21] Appl. No.: 980,488

[22] Filed: Nov. 23, 1992

[30] Foreign Application Priority Data

Nov. 25, 1991 [JP] Japan .................. 3-309097

[51] Int. Cl.$^5$ .......................... G11B 7/125
[52] U.S. Cl. .................... 369/54; 369/116; 369/53; 369/59
[58] Field of Search ............ 369/53, 54, 58, 116, 369/44.27, 59

[56] References Cited

U.S. PATENT DOCUMENTS 5,070,495  12/1991  Bletscher, Jr. et al. .......... 369/54 X

FOREIGN PATENT DOCUMENTS

0446892A3  9/1991  European Pat. Off. .
0453161A2  10/1991  European Pat. Off. .

OTHER PUBLICATIONS

Patent Abstracts of Japan, vol. 14, No. 230 (P-1048), 16 May 1990 & JP-A-20 54 424 (Nippon Columbia), 23 Feb. 1990.

Primary Examiner—Aristotelis Psitos
Assistant Examiner—Duncan Wilkinson
Attorney, Agent, or Firm—Philip M. Shaw, Jr.

[57] ABSTRACT

The present invention is directed to a writable optical disk recording apparatus in which an output power of a laser beam is controlled even during a recording period. During a calibration mode, a reproduced (reflected) signal from a matrix circuit (12) is supplied to level hold circuits (37), (38). The level hold circuits (37), (38) are controlled at predetermined timings relative to recording EFM (eight-to-fourteen modulated) signals of bit lengths (3T) and (11T) under the control of a microcomputer (CPU) (31). Signals from the level hold circuits (37), (38) are supplied to a calculating circuit (39) which calculates, for example, a difference or ratio between the two signals. A calculated value is stored in a memory (40). The value stored in the memory (40) and a value newly calculated by the calculating circuit (39) during EFM data recording are compared with each other by a subtracting circuit (41). A compared output is selected by a switch (34) and then supplied through a subtracting circuit (35) to control a laser driver (3).

4 Claims, 5 Drawing Sheets

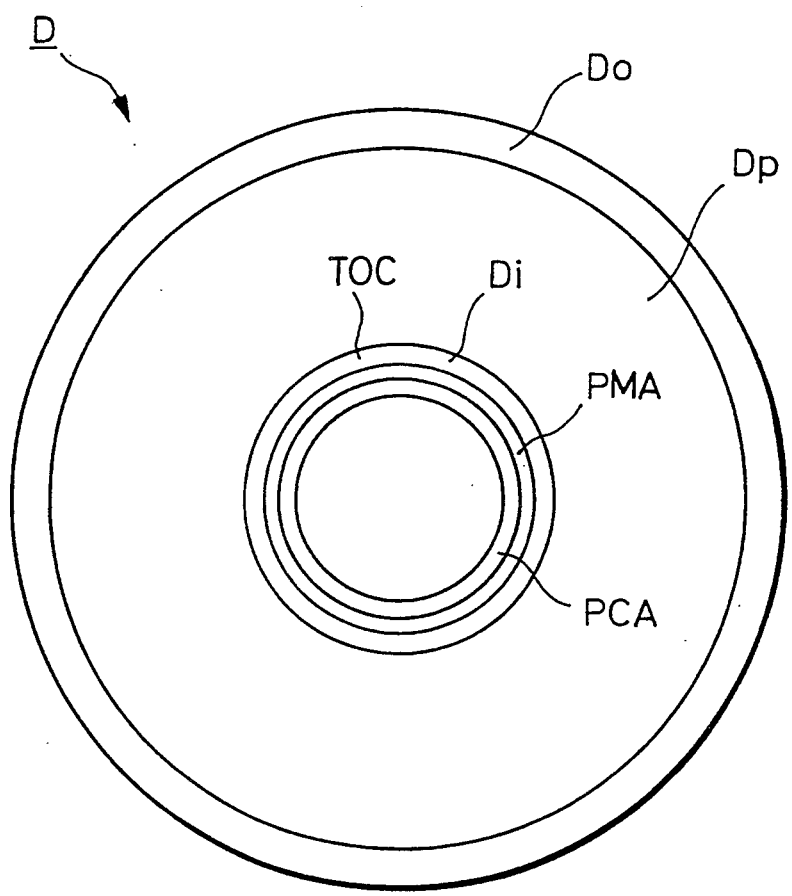

WRITABLE OPTICAL DISK RECORDING APPARATUS

BACKGROUND OF THE INVENTION

1. Field of the Invention

The present invention relates to a writable optical disk recording apparatus for writing arbitrary data on a writable optical disk by the radiation of a light beam or laser beam.

2. Description of the Prior Art

WORM (write once and read many) type optical disks (hereinafter simply referred to as a writable disk) in which an organic pigment is coated on one surface of a disk the size of which is the same as that of, for example, a compact disc (CD) and arbitrary data is written on one surface by the radiation of a laser beam are now commercially available. According to this optical disk, written data thereon can be reproduced by using ordinary compact disc reproducing apparatus and this optical disk can be utilized to manufacture a small number of compact discs.

Such writable optical disks have a very small difference in sensitivity among organic pigments coated by different manufacturers. Although the difference of sensitivity, of course, falls within an allowable range determined in a specification or the like, depending on a combination of a disk, a recording apparatus and a reproducing apparatus, there is then the risk that the disk cannot be reproduced.

Signals are recorded on a CD and a CDROM (compact disc read-only memory) are by a modulation system generally called an EFM (eight-to-fourteen modulation) system. As these signals, there are utilized signals having lengths of nine kinds from 3T to 11T as shown in FIG. 1A of the accompanying drawings. When an RF (radio frequency) signal reproduced from the disk on which these signals are randomly recorded is observed through an oscilloscope, then eye pattern waveforms shown in FIGS. 2A to 2C of the accompanying drawings are obtained. By examining a characteristic (asymmetry) of the eye pattern waveform, it is possible to understand the output state of a laser beam relative to an organic pigment. FIGS. 2A through 2C show the change of characteristic (asymmetry) of a reproduced signal relative to an output of a laser beam and a sensitivity of organic pigment. FIG. 2A shows the condition such that a sensitivity of organic pigment is low and the output of laser beam is set in a so-called under-power. In this case, a pit formed on the optical disk is small and a degree that a radiated laser beam is irregularly reflected on the pits is small so that the radiated laser beam approaches a mirror level of total reflection. In this case, the characteristic (asymmetry) of the reproduced signal approaches an upper side (mirror level). FIG. 2C shows the condition such that a sensitivity of organic pigment is high and the output of the laser power is set in a so-called over-power. An area of pit formed on the optical disk is increased and a radiated laser beam is reflected irregularly so that the level of the reproduced signal from the reflected laser beam is lowered. Therefore, the characteristic (asymmetry) of the reproduced signal from the reflected laser beam is moved toward the lower side.

When the sensitivity of the organic pigment and the output of the laser beam are set in a proper relationship, as shown in FIG. 2B, the characteristic (asymmetry) of the reproduced signal is located at the center of the signal amplitude. Thus, an eye pattern that is used to detect a signal becomes smaller as the characteristic (asymmetry) of the reproduced signal comes away from the center of the signal amplitude, thereby making it impossible to reproduce the signal.

To solve the above problem, it is proposed to adjust an output power of a recording laser beam by identifying a signal that was written for a trial on a power control area (PCA) provided at one portion of the disk. FIG. 3 of the accompanying drawings schematically shows one surface of a disk D. As shown in FIG. 3, a program recording area Dp is provided on the disk D similarly to the compact disc, a lead-in area Di including a TOC (table of contents) in which playing time data of program or the like is recorded is provided at the inner peripheral side of the program recording area Dp, and a lead-out area Do is provided at the outer peripheral side of the program recording area Dp.

Further, on the inner peripheral side of the lead-in area Di, there are provided a program memory area PMA in which playing time data of programs recorded until the recording of all programs is completed, etc., are recorded and a power control area PCA which is used to adjust the output power of a laser beam by checking a sensitivity of organic pigment coated on the disk D. Before the recording is started, an arbitrary signal is recorded (recorded for test) on the power control area PCA while the output level of the laser beam is sequentially changed. Then, the output level at which the reproduced signal of the signal thus recorded comes to have a predetermined characteristic (asymmetry) is determined and the output power of the laser beam is adjusted to this determined output level.

When the output power of the laser beam is adjusted by writing the arbitrary signal on the power control area PCA for a test, the adjusted output power value of the laser beam is maintained during the recording. Therefore, if a wavelength of a laser diode that emits a laser beam is displaced due to the change of temperature and the like during the recording or a sensitivity of organic pigment becomes different on the inner and outer peripheries of the optical disk, then the above previously-proposed technique becomes useless.

It is customary that an output power of the laser diode is controlled by detecting (i.e., so-called front monitor) the intensity of laser beam. This conventional method, however, cannot eliminate the disadvantages brought about when the sensitivity of the organic pigment coated on the disk surface is changed due to the fluctuation of wavelength of the laser diode or a sensitivity becomes different on the inner and outer peripheries of the optical disk.

OBJECTS AND SUMMARY OF THE INVENTION

Therefore, it is an object of the present invention to provide a writable disk recording apparatus in which the aforesaid shortcomings and disadvantages of the prior art can be eliminated.

More specifically, it is an object of the present invention to provide a writable disk recording apparatus which can cope with a change of a sensitivity of a coated organic pigment due to a fluctuation of a wavelength of a laser beam from a laser diode or a difference of sensitivity in inner and outer peripheral portions of an optical disk.

According to an aspect of the present invention, there is provided a writable optical disk recording apparatus for writing arbitrary data on a writable disk by using a laser beam which comprises a circuit for effecting a trial writing on the writable disk at a recording characteristic check area to thereby control an output power of the laser beam, a circuit for storing a reference level of a reflected signal provided when a signal of a shortest bit length and a signal of an arbitrary bit length longer than the former which are recorded at a proper level in the check area for trial, and a circuit for comparing during recording of EFM data, a level of a reflected signal provided when the signals of shortest bit length and arbitrary longer bit length are recorded in a data area with the stored reference level, wherein the output power of the laser beam is controlled by a compared output.

According to the present invention, since the level of the reflected signal of the predetermined signal is detected during EFM recording to control the output power of the laser beam, the apparatus of the present invention can cope with the change of the coated organic pigment due to the fluctuation of the wavelength and the difference of sensitivity in the inner and outer peripheral portions of the optical disk.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 3 is a diagram used to explain a WORM (write once and read many) type optical disk.

DETAILED DESCRIPTION OF THE PREFERRED EMBODIMENT

The present invention will now be described with reference to the drawings.

Figure 4A:
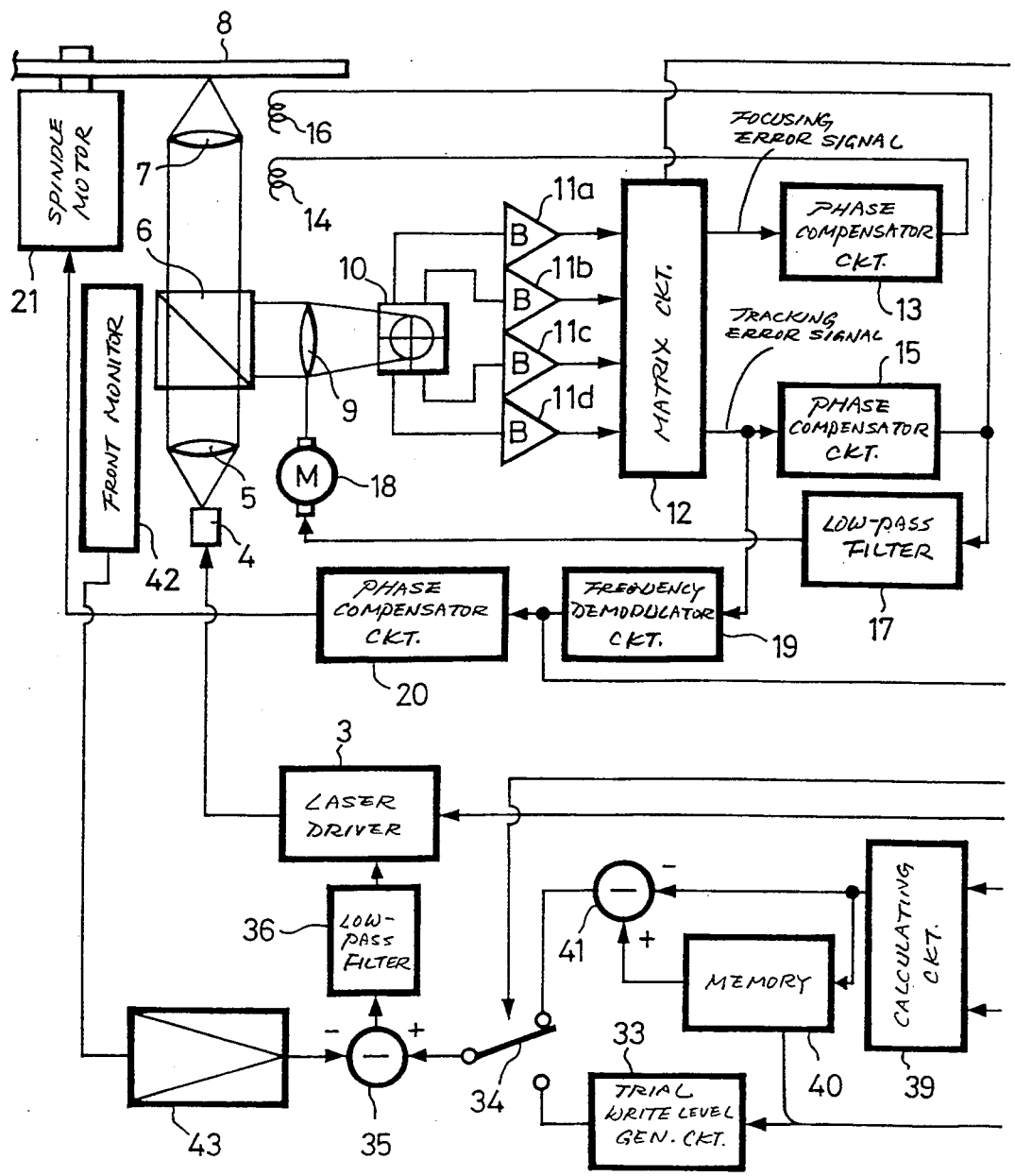
FIG. 4, which is formed of FIGS. 4A, 4B, is a block diagram showing an arrangement of a writable optical disk recording apparatus according to an embodiment of the present invention.
Figure 4B:
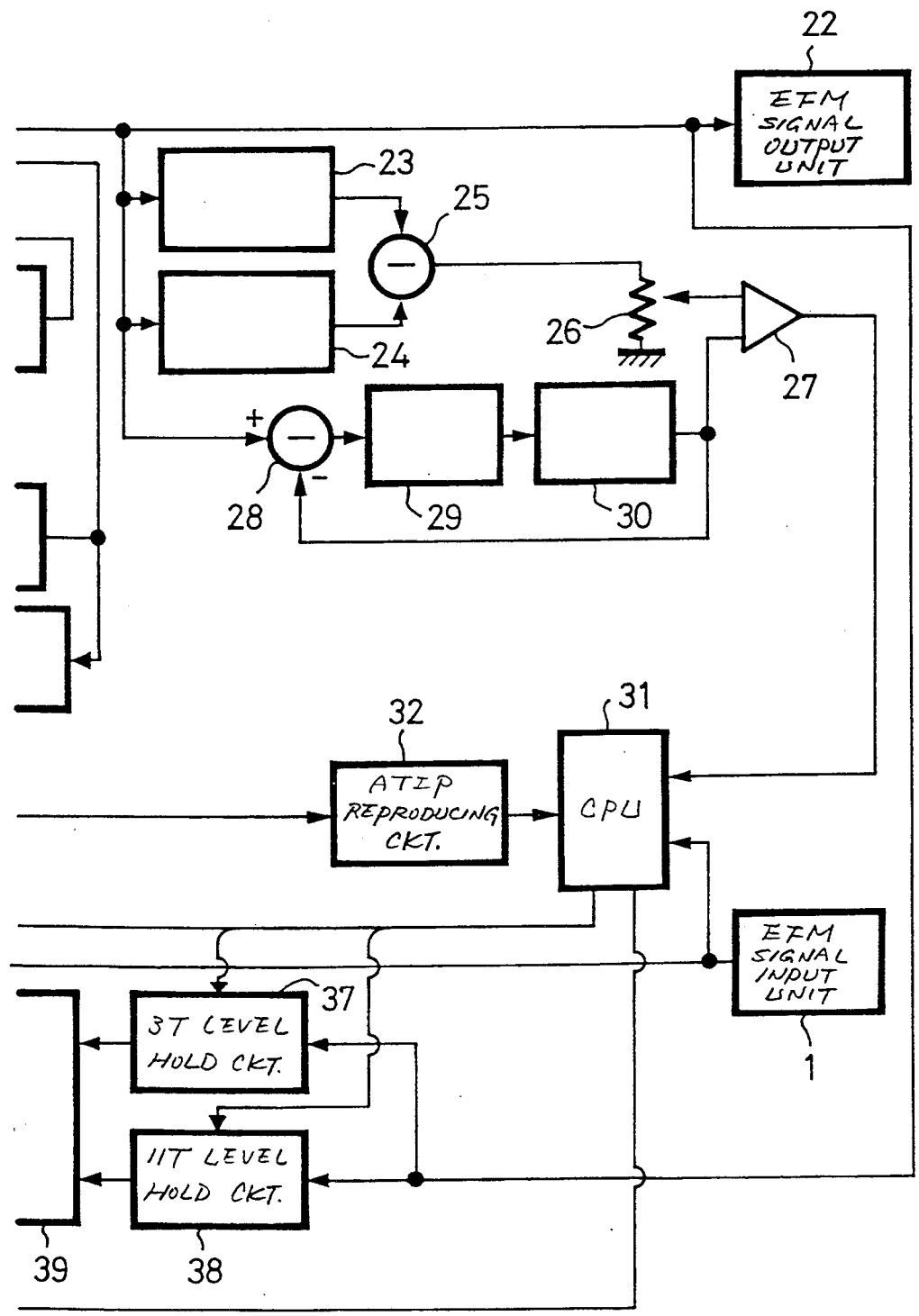

FIG. 4 (formed of FIGS. 4A, 4B drawn on two sheets of drawings so as to permit the use of a suitably large scale) of the accompanying drawings shows an arrangement of a writable optical disk recording apparatus according to an embodiment of the present invention.

As shown in FIG. 4, there is provided an input unit 1 to which an EFM (eight-to-fourteen modulated) signal is input. The EFM signal from the input unit 1 is supplied to a laser driver 3 and the power of a light or laser beam from a laser diode 4 is controlled by the laser driver 3. The laser beam from the laser diode 4 travels through a collimating lens 5, a beam splitter 6 and an objective lens 7 and radiates on the organic pigment coated on one surface of a writable optical disk 8. A reflected laser beam from the writable optical disk 8 is radiated on the beam splitter 6 through the objective lens 7 and a laser beam reflected on this beam splitter 6 is radiated through a cylindrical lens 9 on a quadrant photo-detector 10, for example.

Signals from respective segments from the quadrant photodetector 10 are respectively supplied through head amplifiers (B) 11a to 11d to a matrix circuit 12. The matrix circuit 12 derives a focusing error signal and this focusing error signal is supplied through a phase compensator circuit 13 to a focusing actuator 14. Also, the matrix circuit 12 derives a tracking error signal and this tracking error signal is supplied through a phase compensator circuit 15 to a tracking actuator 16. A signal from the phase compensator circuit 15 is supplied through a low-pass filter 17 to a feed motor 18.

The tracking error signal from the matrix circuit 12 is supplied to a frequency demodulator circuit 19, in which it is demodulated to provide a signal having a wobbling frequency of 22.05 kHz, for example, at a predetermined level. The signal thus derived is supplied through a phase compensator circuit 20 to a spindle motor 21.

In this way, the focusing servo and the tracking servo are carried out and the feed motor 18 is driven so that the laser beam traces the above pregrooves. Further, the rotary servo is effected so that the laser beam traces the pregrooves at a constant linear velocity. Under this condition, the EFM signal from the EFM input unit 1 is recorded on the organic pigment coated on one surface of the optical disk 8.

The matrix circuit 12 also derives a reproduced signal from the reflected beam on the optical disk 8. This reproduced signal is supplied to an EFM signal output unit 22. The reproduced signal from the matrix circuit 12 is also supplied to a peak hold circuit 23 and a bottom hold circuit 24. Output signals from the peak hold circuit 23 and the bottom hold circuit 24 are supplied to a subtracter circuit 25 which derives an amplitude of the reproduced signal. The amplitude thus derived is supplied through an attenuator 26 to a window comparator 27.

The reproduced signal from the matrix circuit 12 is further supplied to one input of a subtracter circuit 28. A signal from the subtracter circuit 28 is supplied to a comparator 29 which determines the polarity of a signal supplied thereto. An output of the comparator 29 is fed through a low-pass filter 30 back to another input of the subtracter circuit 28, whereby the low-pass filter 30 derives an asymmetry level of the reproduced signal. This asymmetry level is supplied to the window comparator 27 which then determines whether or not the asymmetry level falls within a predetermined range of the amplitude of the reproduced signal. A determined signal from the window comparator 27 is supplied to a microcomputer (central processing unit (CPU)) 31.

An FM signal having a clock frequency of 6.3 kHz representative of a digital value (ATIP) that represents hour:minute:second:frame is superimposed upon the pregroove wobbling frequency signal. A signal from the frequency demodulator circuit 19 is supplied to an ATIP circuit 32, from which a reproduced ATIP digital value is supplied to the microcomputer (CPU) 31.

There is provided a trial write level generator circuit 33. A signal from the trial write level generator circuit 33 is selected by a switch 34 and then supplied though a subtracter circuit 35 and a low-pass filter 36 to an output level control section of the laser driver 3. The generator circuit 33 and the switch 34 are controlled by the microcomputer (CPU) 31.

The reproduced signal from the matrix circuit 12 is also supplied to level hold circuits 37, 38. The level hold circuits 37, 38 are driven at predetermined timings relative to 3T and 11T signals, which will be described later, under the control of the microcomputer (CPU) 31. Signals from the hold circuits 37, 38 are supplied to a calculating circuit 39 which calculates a difference between the two signals or a ratio therebetween. A calculated value from the calculating circuit 39 is stored in a memory 40. The value stored in the memory 40 and a value, newly calculated by the calculating circuit 39, are compared with each other by a subtracter circuit 41, and a compared output from the subtracter circuit 41 is selected by the switch 34 and then supplied to the subtracter circuit 35.

A reflected beam of the laser beam from the collimator lens 5 on the beam splitter 6 is radiated on a front monitor 42. A signal from the front monitor 42 is supplied through a head amplifier 43 to the subtracter circuit 35.

According to this recording apparatus, before the recording is started, the laser beam from the laser diode 4 is radiated on the above power control area PCA. Also, the switch 34 is switched to the generator circuit 33 side. Further, the generator circuit 33 is controlled by the microcomputer (CPU) 31, whereby a trial write level signal whose level is changed sequentially is supplied from the generator circuit 33 to the output level control section of the laser driver 3.

Thus, the trial writing is effected on the power control area PCA. Simultaneously, a pregroove wobbling frequency at that time is demodulated to reproduce the ATIP. This ATIP is supplied to the microcomputer (CPU) 31 and then stored therein while the generator circuit 33 is being controlled. That is, by the control of the generator circuit 33, the ATIP at that time is stored in the microcomputer 31 each time the output level of the laser beam from the laser diode 4 is sequentially switched.

When the writing corresponding to all trial writing levels generated from the generator circuit 33 is ended, the power control area PCA in which the trial writing is effected is reproduced. Then, of the signals thus reproduced, the ATIP generated when a signal whose asymmetry level lies in a predetermined range of amplitude is identified and the generator circuit 33 is controlled so as to be set in the trial writing level state when the ATIP is stored. In this way, the output level of the laser beam from the laser diode 4 is controlled such that the output level of the laser beam becomes appropriate to the sensitivity of the organic pigment.

Further, according to the recording apparatus of the present invention, under the condition that the laser beam is controlled so as to have a proper output level, an arbitrary EFM signal is recorded on the above power control area PCA. Then, a reflected (reproduced) signal provided when this EFM signal is recorded is generated from the matrix circuit 12 and then fed to the hold circuits 37, 38. Whereas, this EFM signal is supplied to the microcomputer (CPU) 31 which discriminates a signal of shortest bit length 3T and a signal of an arbitrary bit length 11T that is longer than the shortest bit length 3T. Then, the level hold circuits 37, 38 are driven at a timing in which the EFM signal is discriminated by the microcomputer 31.

Figures 1A, 1B:
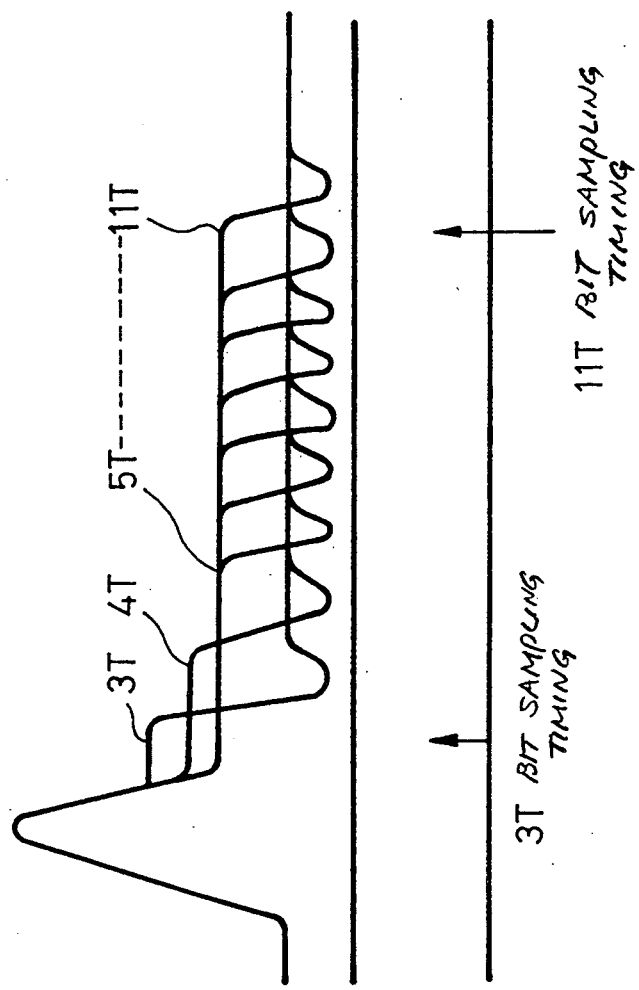
FIGS. 1A and 1B are diagrams used to explain a sampling timing, respectively.
Figure 2A:
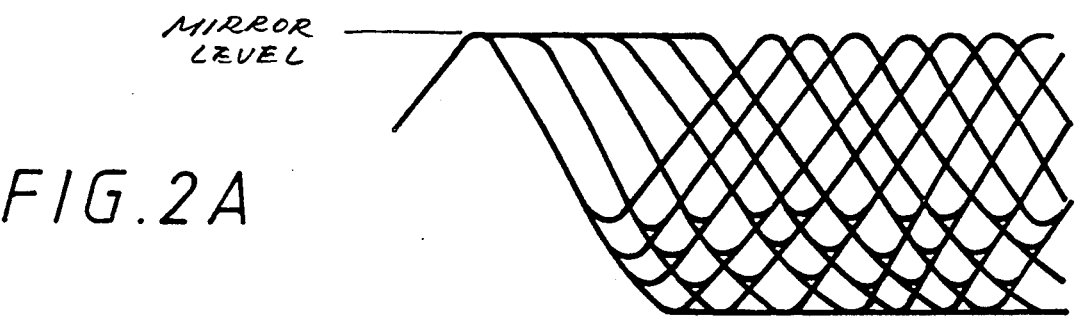
FIGS. 2A to 2C are diagrams showing a change of a characteristic (asymmetry) of a reproduced signal by a power of a laser beam and sensitivity of organic pigment, respectively.
Figure 2B:
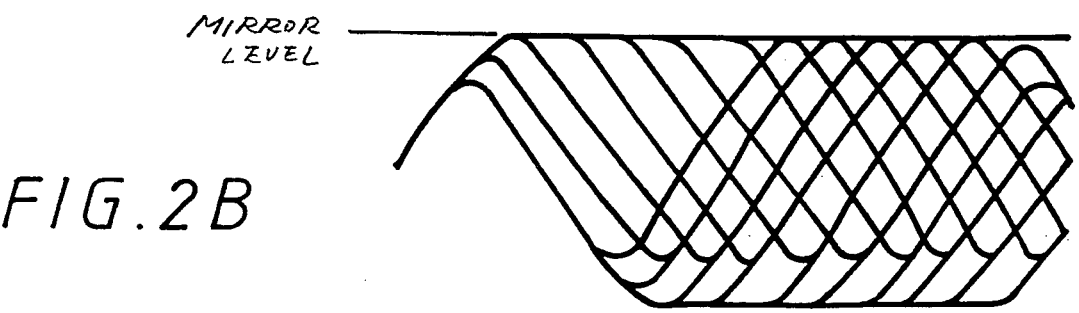
Figure 2C:
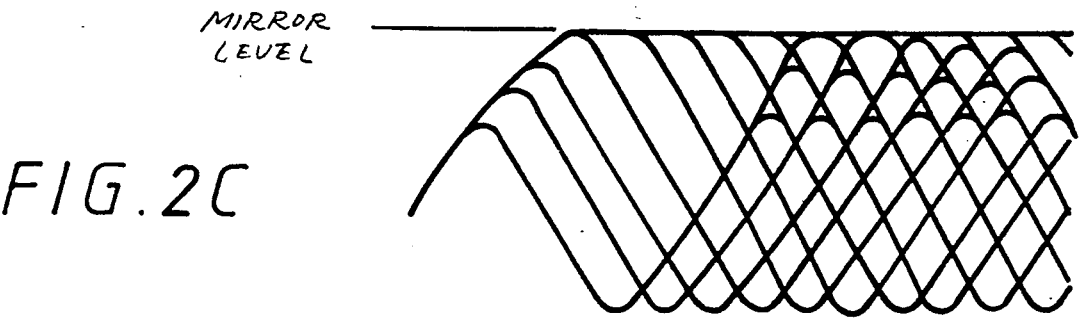

Thus, the levels of reflected (reproduced) signals, provided when the signal of the shortest bit length 3T and the signal of the arbitrary bit length lit longer than the former bit length 3T are recorded, are sampled and held in the level hold circuits 37, 38, respectively. FIGS. 1A and 1B of the accompanying drawings show sampling timings. Then, levels held in the level hold circuits 37, 38 are supplied to the calculating circuit 39 which calculates a difference between these levels or ratio therebetween. A calculated value is stored in the memory 40.

Furthermore, according to the recording apparatus of the present invention, upon recording, the signal from the front monitor 42 is supplied through the subtracter circuit 35 to the laser driver 3 and the laser driver 3 is controlled in such a fashion that the power of the output laser beam from the laser diode 4 becomes constant. Simultaneously, the switch 34 is switched to the subtracter circuit 41 side upon recording.

Further during recording of an EFM signal, the microcomputer (CPU) 31 identifies the signal of the shortest bit length 3T and the signal of the arbitrary bit length 11T longer than the former bit length which have been recorded on data area Dp of the disc in a manner similar to the recording mode in which the trial writing is effected on the power control area PCA. Then, the level hold circuits 37, 38 are driven at the timings at which the signals are discriminated by the microcomputer (CPU) 31. Thus, the levels of the reflected (reproduced) signals, provided when the signal of the shortest bit length 3T and the signal of the arbitrary longer bit length 11T are recorded during EFM data recording are sampled and held by the level hold circuits 37, 38.

The levels held in the level hold circuits 37, 38 are supplied to the calculating circuit 39 which then calculates a difference between these levels or ratio therebetween. A calculated value and the value stored in the memory 40 are compared by the subtracter circuit 41 to thereby detect a difference component between these values. The difference component thus detected is supplied through the switch 34 to the subtracter circuit 35 and the power of the laser beam emitted from the laser diode 4 is controlled such that the calculated value and the value stored in the memory 40 become equal to each other.

As described above, according to the recording apparatus of the present invention, since the level of the reflected signal of a predetermined signal is detected to control the output power of the laser beam even during the recording period, the apparatus of the present invention can cope with the change of sensitivity of the coated organic pigment due to the fluctuation of wavelength, a difference of sensitivity between the inner and outer peripheral portions of the optical disk or the like.

Therefore, even though the quality of the write laser beam is changed particularly when the wavelength of the laser diode is displaced, the sensitivity of coated organic pigment is fluctuated in the inner and outer peripheral portions of the optical disk and disk parameters such as skew angle or the like are changed, the asymmetry of the signal written on the optical disk can be controlled on the basis of the reflected signal that is being written. Therefore, the quality (particularly, asymmetry) of the signal on the finished optical disk can be constantly held at a constant level.

As the signal recorded on the power control area PCA under the condition such that the output of the laser beam becomes proper, it is possible to use a signal having an arbitrary bit length 11T longer than the shortest bit length 3T generated from the microcomputer (CPU) 31.

According to the present invention, since the level of the reflected signal of the predetermined signal is detected to control the output power of the laser beam even during the data recording period, the apparatus of the present invention can cope with the change of the coated organic pigment due to the fluctuation of the wavelength and the difference of sensitivity between the inner and outer peripheral portions of the optical disk.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A writable optical disk recording apparatus for writing arbitrary data on a writable disk by using a laser beam comprising:
    (a) means for effecting a trial writing on said writable disk at a recording characteristic check area, reproducing a recorded calibration signal from the recording characteristic check area and using the reproduced calibration signal to thereby control an output power of said laser beam and recording a first signal of a shortest bit length and a second signal of an arbitrary bit length longer than the shortest bit length in the recording characteristic check area using the laser beam whose output power is controlled by using the calibration signal;
    (b) means for reproducing and separately storing as a first reference signal and a second reference signal the first signal and the second signal from the characteristic check area; and
    (c) means for simultaneously reproducing recorded data signals during subsequent recording of data in a data area of the writable disk and comparing a level of a reflected signal provided when signals of the shortest bit length and the arbitrary longer bit length are recorded with the first reference signal and the second reference signal and accordingly controlling the output power of said laser beam.

2. The writable optical disk recording apparatus according to claim 1, further comprising:
    means for detecting a difference between said signals of shortest bit length and of longest bit length;
    means for storing said difference when the trial writing is effected;
    means for comparing a level difference between said shortest bit length signals and said longest bit length signals reproduced during recording with said stored difference signal to thereby control the output power of said laser beam.

3. The writable optical disk recording apparatus according to claim 2, wherein said detecting means detects a ratio between said shortest bit length signal and said longest bit length signal and said detected ratio is compared with said stored difference signal to thereby control the output power of said laser beam in accordance with a compared result.

4. The writable optical disk recording apparatus according to claim 1, wherein the recorded data signals are eight-to-fourteen modulated digital data signals and the shortest bit length and the arbitrary bit length are of 3 sampling bit lengths and 11 sampling bit lengths, respectively.

* * * * *